Figure 1B:
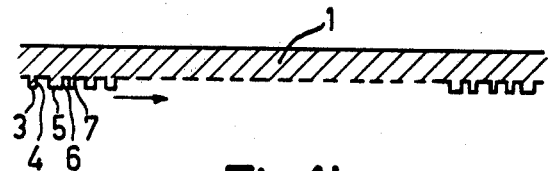

United States Patent [19]

Kramer et al.

[11] 4,160,269

[45] * Jul. 3, 1979

[54] APPARATUS FOR OPTICALLY READING A PHASE-MODULATED OPTICAL RECORD CARRIER

[75] Inventors: Pieter Kramer; Klaas Compaan, both of Eindhoven, Netherlands; Robert F. K. Forsthuber, Vienna, Austria

[73] Assignee: U.S. Philips Corporation, New York, N.Y.

[*] Notice: The portion of the term of this patent subsequent to Aug. 9, 1994, has been disclaimed.

[21] Appl. No.: 801,018

[22] Filed: May 27, 1977

Related U.S. Application Data

[60] Division of Ser. No. 618,215, Sep. 30, 1975, Pat. No. 4,041,530, which is a continuation of Ser. No. 396,399, Sep. 12, 1973, abandoned, which is a continuation of Ser. No. 229,285, Feb. 25, 1972, abandoned.

[30] Foreign Application Priority Data

Mar. 4, 1971 [NL] Netherlands ............... 7102863

[51] Int. Cl.² .................. H04N 5/76; G11B 7/12
[52] U.S. Cl. .............. 358/128; 179/100.3 V; 179/100.3 G; 365/124
[58] Field of Search .......... 358/127, 128, 129; 179/100.3 V, 100.41 L, 100.4 C, 100.4 R, 100.4 M, 100.3 G; 274/42 R, 41 R, 41.6 R; 340/173 LT, 173 LM; 365/120, 124, 126, 127

[56] References Cited

U.S. PATENT DOCUMENTS

| | | | |
|---|---|---|---|
| 2,985,866 | 5/1961 | Norton | 365/126 |
| 3,287,563 | 11/1966 | Clunis | 179/100.3 V |
| 3,335,413 | 8/1967 | Glenn, Jr. | 365/126 |
| 3,427,628 | 2/1969 | Clunis | 179/100.3 V |
| 3,430,966 | 3/1969 | Gregg | 179/100.3 V |
| 3,534,166 | 10/1970 | Korpel | 179/100.3 V |
| 3,618,048 | 11/1971 | Pennington | 365/126 |
| 3,654,401 | 4/1972 | Dickopp et al. | 179/100.41 L |
| 3,688,025 | 8/1972 | Whittemore | 179/100.3 G |
| 3,838,401 | 9/1974 | Graf et al. | 365/126 |
| 3,931,459 | 1/1976 | Korpel | 358/128 |
| 4,041,530 | 8/1977 | Kramer et al. | 358/128 |

OTHER PUBLICATIONS

Fleisher et al., Readout From Thermoplastic Record Element, IBM Tech. Disc. Bulletin, vol. 10, No. 7, 12/67, 975-976.

Primary Examiner—Raymond F. Cardillo, Jr.
Attorney, Agent, or Firm—Thomas A. Briody; William J. Streeter; Simon L. Cohen

[57] ABSTRACT

Apparatus for reading a record carrier provided with a spiral structure in which sound and/or image information is stored in the form of frequency modulated or phase modulated signals is disclosed. The carrier structure is composed of coplanar regions of variable length separated by coplanar areas of variable length. Where the regions and areas are all in the same plane the regions and areas have different coefficients of reflection or transmission. Where the regions and areas are not coplanar they are spaced by a distance sufficient to produce in response to impinging radiation a one-half wave length difference in the radiation exiting the regions and areas. The apparatus provides a light beam with a frequency that facilitates diffraction of the beam by the areas and regions, and also provides a radiation sensitive detection system for converting the light beam modulations caused by the record carrier into a corresponding electrical signal.

14 Claims, 7 Drawing Figures

APPARATUS FOR OPTICALLY READING A PHASE-MODULATED OPTICAL RECORD CARRIER

This is a division of U.S. patent application Ser. No. 618,215, filed Sept. 30, 1975, now U.S. Pat. No. 4,041,530, which was a continuation of Ser. No. 396,399, filed Sept. 12, 1973, now abandoned, which was a continuation of Ser. No. 229,285, filed Feb. 25, 1972, now abandoned.

The invention relates to a carrier provided with a spiral structure in which sound and/or image information in the form of frequency-modulated or phase-modulated signals is stored. Both frequency-modulated and phase-modulated signals may be referred to as angle-modulated signals. The term "spiral structure" is to be understood to mean a structure composed of a large number of quasi-concentric or concentric tracks. The invention also relates to an apparatus for detecting information stored in the carrier by means of a beam of radiation which after interaction with the structure is supplied to a radiation-sensitive detection system.

A carrier and an apparatus of the aforementioned type are known. The known carrier has a spiral groove the bottom of which has an undulating profile. Although in reproducing the known carrier the conventional gramophone disc record technology is used, manufacture of the first carrier is a time-consuming laborious process, for the information is stored in the form of grooves which can only be formed by means of machine tools.

When detecting the information stored in the known carrier the angle at which the surfaces of the undulating grooves are in the plane of the carrier plays an essential part. Moreover the lands between the consecutive tracks play an essential roll in following the track. This renders it necessary to provide a complicated three-dimensional profile on the carrier.

The disadvantage to which the known carrier is subject are avoided in the carrier according to the invention which has a quasi-two dimensional profile. The carrier according to the invention may comparatively simply and rapidly be manufactured by photographic and etching methods.

The invention is characterized in that the structure is composed of regions of variable lengths which lie in one plane and are separated by areas of variable lengths which also lie in one plane. The regions have optical properties that impart to an impinging beam of radiation a phase or amplitude that differs from the phase or amplitude imparted to the beam by the areas. The beam of radiation which interacts with these blocks is therefore modulated in phase or in amplitude by the said structure. The modulated radiation beam is applied to a radiation-sensitive detection system. The recurrence of characteristic values of the signal produced in the detection system, for example the reoccurence of the passages through zero of the alternating-voltage component of the signal, is detected. Variations in the luminous flux of the source of light and defocussing do not affect the mutual time differences between these passages through zero, nor do variations in the properties of the photographic material. The regions are advantageously given a coefficient of reflection or transmission which is different from that of the areas.

A particularly advantageous structure for storing information in the form of frequency-modulated signals is a structure in which the planes are spaced from one another by a constant distance. The advantage of this feature is that such a structure may readily be manufactured by means of lithographic processes. In addition, detection of the stored signal is comparatively simple, for such a crenellated structure may optically be regarded as a phase structure capable be being read by known optical means. Obviously, the transitions between successive regions and areas may be either abrupt or smooth both in the direction of the track and in the axial direction of the carrier. To protect the carrier provided with the information its surface on which the information is provided may be coated with a protective layer.

Hence, according to a feature of the invention an apparatus for detecting the information stored in the carrier by means of a beam of radiation which after interaction with the structure is applied to a radiation-sensitive detection system includes an image-forming element inserted to the ray-path. In particular, the radiation beam which has interacted with the information in the carrier is divided by an element into two sub-beams which are relatively shifted through a small distance.

According to another feature of the invention an apparatus for detecting the information stored in the carrier by means of a beam of radiation which after interaction with the structure is applied to a radiation-sensitive detection system includes an element which imparts a mutual phase difference to the sub-beams which are produced at the structure by diffraction.

Figure 1A:
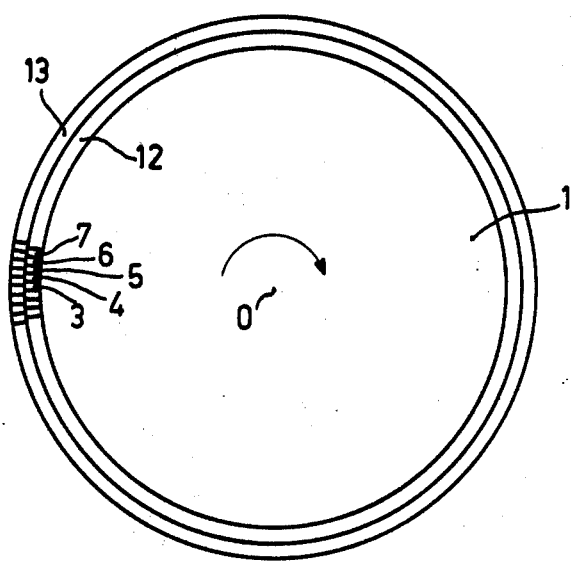

Enbodiments of the invention will now be described, by way of example, with reference to the accompanying diagrammatic drawings, in which:

FIGS. 1a and 1b show a carrier according to the invention, and

Figure 2:
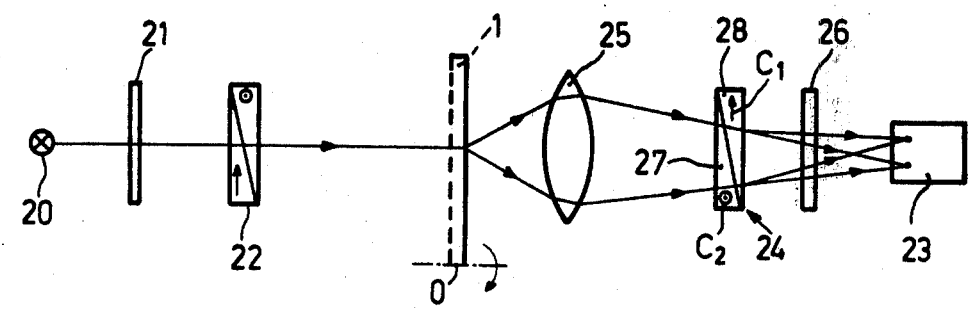
Figure 3:
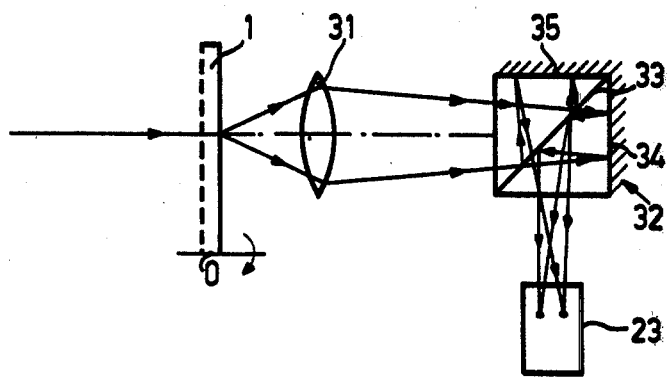
Figure 4:
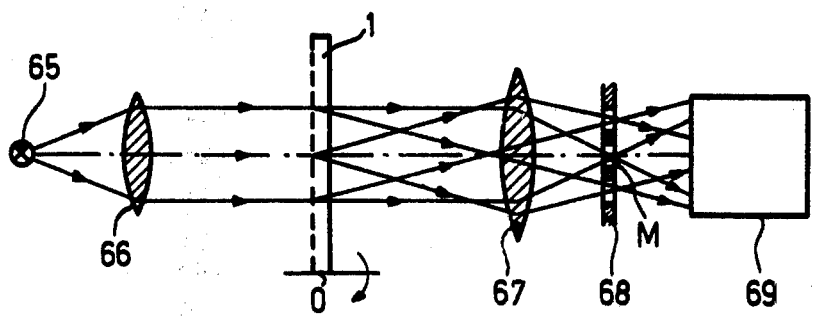
Figure 5:
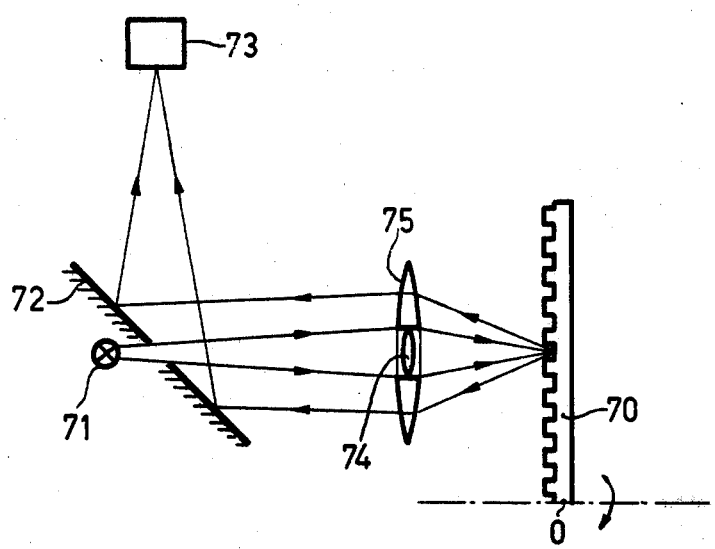
Figure 6:
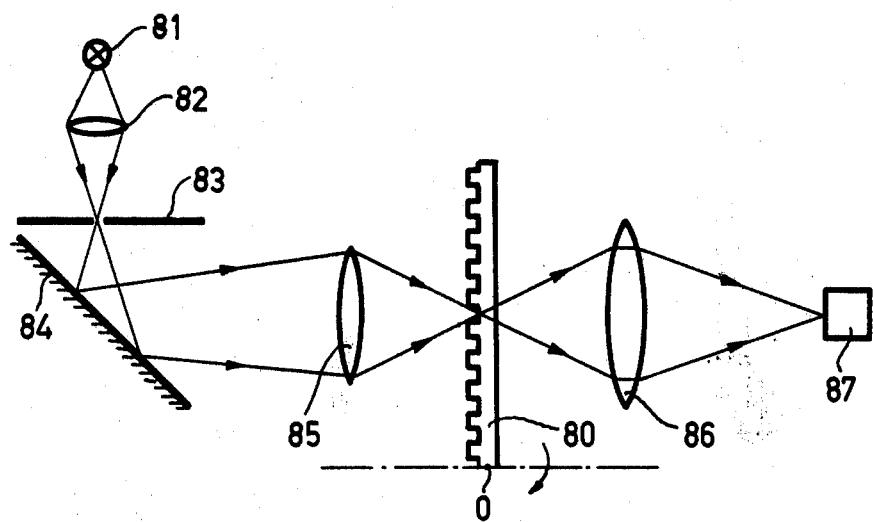

FIG. 2 is a schematic of a first system for detecting the information stored in the carrier of FIG. 1, FIG. 3 is a schematic of a second system for detecting the information stored in the carrier of FIG. 1 using a prism interferometer, FIG. 4 is a schematic of a third system for detecting the information stored in the carrier of FIG. 1, using a phase plate, FIG. 5 is a schematic of a fourth system for detecting the information stored in a reflective carrier as shown in FIG. 1 using a multi-element lens, and FIG. 6 is a schematic of a fifth system for detecting the information stored in a transmission type carrier as shown in FIG. 1 using a lens system on both sides of the carrier.

FIG. 1a is a plan view of part of a carrier 1. The carrier 1 contains a spiral structure having a large number of quasi-concentric tracks. These tracks may alternatively be concentric, as shown in FIG. 1a. Only part of two adjacent tracks (designated 12 and 13) is shown. Each track comprises a crenellated structure the dimensions of which are shown exaggerated in FIG. 1b. The spacings (areas) between the raised surfaces 3 and 5, 5 and 7, and so on of the merlons (regions) are different and so are their lengths. Both spacings and lengths are determined by the information stored in the tracks. The heights 4, 6, and so on of the merions are equal to one another and in the case of transmission preferably are equal to about one wavelength of the radiation by means of which the carrier is scanned. In the case of reflection they are equal to one quarter of the wavelength of the radiation by means of which the carrier is scanned. Alternately, as noted above, the upper surfaces of the merlons may be coplanar with the upper surfaces of the spaces. In this case the regions have different coefficients of transmission or reflection than that of the areas.

The carrier may be made of, for example, polyvinyl acetate. The spacing between adjacent tracks is, for example, 4 μm, and the smallest period in each track is, for example, 2.5 μm. The carrier rotates at a speed of, for example, 1,500 revolutions per minute about its axis, which in FIG. 1a is designated by O. The arrow in FIG. 1b indicates the travelling direction of the track.

In the reading apparatus shown in FIG. 2 a collimated beam of light from a source of light 20 is incident via a polarizer 21 on the carrier 1 the tracks of which have a crenellated structure. A lens 25 produces on a detector 23 an image of the part of the carrier 1 on which the light beam falls. according to the invention a Wollaston prism 24 is inserted in the path of the light beam between the carrier 1 and the detector 23. The Wollaston prism comprises two congruent prisms 27 and 28 which each consist of a uniaxial birefringent crystal and together form a plane-parallel plate 24. The optic axis $c_1$ of the crystal 28 is parallel to the plane of the drawing and the optic axis $C_2$ of the crystal 27 is at right angles to the plane of the drawing. The light beam incident on one of the parallel larger surfaces of the Wollaston prism 24 is divided in the prism into two sub-beams which are polarized at right angles to one another and extend at a small angle to one another.

Consequently, in the plane of the detector 23 two images of the illuminated part of the carrier 1 are produced which are relatively shifted. Between the Wollaston prism 24 and the detector 23 there is arranged a polarizer 26 the direction of polarization of which is at an angle of 45° with respect to the optic axes $c_1$ and $c_2$ of the crystals 28 and 27 respectively.

Thus, the differences between the intensities of the two images measured in the detector 23 have maximum value. These differences are due to the path length differences of the light beam in the crenellated structure and, owing to the suitable choice of about one wavelength for the height of the merlons, are $\frac{1}{2} \lambda$.

The path length difference of the sub-beams forming the two images which is produced in the Wollaston prism 24 is compensated by a path length difference produced in a Wollaston prism 22 which is identical to the prism 24 and is inserted between the carrier 1 and the polarizer 21.

The Wallaston prism 24 may be replaced by a Savart plate. A Savart plate consists of two equally thick plane-parallel quartz plates the optic axis of which are at angles of 45° to the plane-parallel surfaces and are crossed. A light beam normally incident on one of the plane-parallel surfaces of the Savart plate is split in the first quartz plate into an ordinary ray and an extra-ordinary ray, which at the interface between the first and the second quartz plates are converted into an extraordinary ray and an ordinary ray respectively, since the optic axes of the two crystals are at right angles to one another. From the Savart plates there emerge two sub-beams which are polarized at right angles to one another and are shifted relatively to one another. An analyzer 26 again is crossed with respect to the optic axes of the Savart plate. In this embodiment also, the path difference between the two rays due to the Savart plate is compensated by the insertion of an identical Savart plate between the carrier 1 and the light source 20.

In the apparatus shown in FIG. 3 an image of the carrier 1 is formed by a lens 31 on the detector 23. From the carrier 1 there again emerges a wave front having a phase structure due to the path length differences in the crenellated structure of the track on the carrier 1.

An interferometer 32 is arranged between the lens 31 and the detector 23. The interferometer 32 comprises two prisms made of a suitable glass and cemented together. At the semi-transmitting interference 33 of the prisms part of the beam is transmitted and part is reflected.

The transmitted and reflected sub-beams are reflected at the reflective lateral surfaces 34 and 35 respectively of the component prisms. These surfaces are almost at right angles to one another. The sub-beams reflected by the surfaces 34 and 35 after reflection at a transmission respectively through the interface 33 from closely adjacent parallel images the intensity difference betwen which is again determined by the crenellated structure.

In the apparatus shown in FIG. 4 a divergent lightbeam emitted by a point source 65 is converter by a lens 66 into a collimated light beam which falls on the carrier 1. The zero-order beam which is transmitted by the carrier 1 without diffraction is converted by a lens 67 into a convergent beam which is focused in a point M of a phase plate 68.

The beams transmitted by the carrier 1 as diffracted beams, for example of the order $+1$ and $-1$ (owing to its structure the support may be regarded as a diffraction grating) are converged by the lens 67 in a point which, viewed in the direction of propagation of the radiation beams, lies beyond the phase plate 68. These beams do not pass through the point M of the phase plate 68. At the location at which a detector 69 is arranged the undiffracted beam (zero-order beam) and the diffracted beams ($+1$st-order and $-1$st-order beams) unite.

The phase plate is proportioned such as to introduce a 90° phase difference between the $+1$-order and $-1$-order beams on the one hand and the zero-order beams on the other. Thus, the intensity differences between the beams incident on the detector 69 are as large as possible.

The source of light used in an apparatus for detecting the signals stored in the carrier may be a source having a great brightness and a high degree of coherence, for example a laser. The light source may alternatively be an incoherent source of great brightness, for example a photo-emissive diode. As a further alternative the light source may be a gas discharge tube.

The detector used may be photomultiplier or a solid-state detector, for example a silicon detector.

An advantageous apparatus for detecting the information stored in the carrier is shown in FIG. 5. A carrier 70 has a spiral structure comprising a large number of quasi-concentric tracks. The tracks may also be concentric. Each track has a crenellated structure. The carrier rotates about an axis which in the Figure is shown as a dot-dash line.

A light beam of small aperture produced by a source of light 71 and a narrow slit in a mirror 72 is focused onto the carrier 70 by a lens 74. The crenellated or block-shaped structure on the carrier 70 reflects the focused light beam.

On the plane portions of the crenellated structure, i.e., the portions which extend at right angles to the rotation axis, the light beam is incident at an angle of incidence which is nearly zero degrees. The reflected light beam then has a direction which is substantially opposite to that of the incident beam and an angle of aperture which is equal to that of the beam incident on the carrier. This reflected light beam emerges through the slit in the mirror 72.

When, however, the light beam is incident on the carrier 70 at areas between the plane portions, i.e., the upright faces of the block-shaped structures, owing to diffraction the reflected beam will have a large aperture angle than has the incident beam. By means of an annular objective 75 this scattered light beam reflected at the upright faces of the block-shaped structures after reflection at the mirror 72 is focused onto a detector 73. The upright faces are imaged with a high contrast.

Another apparatus for detecting the information stored in the carrier is shown in FIG. 6. A source of light 81 is imaged by a lens 82 in a slit of a screen 83. From the slit a light beam emerges which via a mirror 84 and a lens 85 is focused onto a carrier 80. The image of the slit on the carrier 80 is smaller than, or equal to, the dimensions of the blocks in the spiral structure on the carrier 80.

The light transmission by the transparent carrier 80 is imaged via an objective 86 on a detector 87 which may be of comparatively large size. Obviously the carrier 80 may alternatively be reflecting. In this case the mirror 84 takes the form of a semitransparent mirror.

The detector 87 may alternatively be replaced by a combination of a slit and a detector which, viewed in the direction of propagation of the light, is located behind the slit. This slit is required to eliminate that portion of the light beam which has interacted with other tracks than the track to be scanned.

What is claimed is:

1. Apparatus for detecting with a light beam information stored in a disc-shaped record carrier provided with a spiral pattern of regions having flat, substantially parallel upper surfaces of variable length separated by flat, substantially coplanar areas of variable length, where the plane of the areas is parallel to the plane of the regions and is separated therefrom by an amount sufficient to introduce a phase difference of nL/2 between portions of the light beam which coact with the flat areas and those which coact with the regions, where n is a positive odd integer and L is a wavelength of the light beam; the apparatus comprising means for directing the light beam to the record carrier, whereby the beam is modulated by the stored information; and a radiation-sensitive detection system means for converting the modulated beam from the record carrier into an electrical signal corresponding to the information.

2. Apparatus are recited in claim 1, further comprising a phase plate in the beam path between the record carrier and the radiation-sensitive detection means for passing to the radiation-sensitive detection means the zero order and first order beams diffracted by the record carrier and for introducing a 90° phase difference between the first order beams.

3. Apparatus as recited in claim 1, further comprising a laser for producing the light beam that is directed to the record carrier.

4. Apparatus as recited in claim 1, further comprising a photo-emissive diode for providing the light beam that is directed to the record carrier.

5. Apparatus as recited in claim 1, further comprising a gas discharge tube for providing the light beam that is directed to the record carrier.

6. Apparatus as recited in claim 1, wherein the radiation-sensitive detection system means includes a photomultiplier.

7. Apparatus as recited in claim 1, wherein the radiation-sensitive detection system means includes a solid-state photo-detector.

8. Apparatus as recited in claim 1, wherein the light beam directed onto the carrier has a small aperture, and further comprising means for guiding the radiation from the carrier to the radiation-sensitive detection system means.

9. Apparatus as recited in claim 1, wherein the radiation beam directed to the carrier is focussed to a point at the location of the carrier.

10. Apparatus as recited in claim 1, further comprising means for imaging the carrier on a diaphragm opening between the record carrier and the radiation-sensitive detection system means.

11. Apparatus as recited in claim 1, further comprising a beam-splitter means in the beam path intermediate the record carrier and the radiation-sensitive detection means for dividing the beam from the record carrier into two sub-beams relatively shifted through a small distance.

12. Apparatus as recited in beam 11, wherein the beam-splitting means comprises a Wollaston prism.

13. Apparatus as recited in claim 11, wherein said beam-splitting means comprises a Savart plate.

14. Apparatus as recited in claim 11, wherein the beam-splitting means comprises a Michelson interferometer having two reflectors inclined at a small angle with respect to each other.

* * * * *

UNITED STATES PATENT AND TRADEMARK OFFICE
CERTIFICATE OF CORRECTION

PATENT NO. : 4160269
DATED : July 3, 1979
INVENTOR(S) : PIETER KRAMER ET AL

It is certified that error appears in the above-identified patent and that said Letters Patent are hereby corrected as shown below:

Column 2, line 68, before "Alternately" add the following

--Thus, the heights 4, 6 of the merlons are sufficient to introduce a phase difference of nL/2 between portions of the light beam that strike the raised surfaces and those that strike the spacings between the raised surfaces, where n is a positive r integer and L is a wavelength of the light beam used to read the record carrier--

Signed and Sealed this

Twentieth Day of November 1979

[SEAL]

Attest:

RUTH C. MASON
Attesting Officer

LUTRELLE F. PARKER
Acting Commissioner of Patents and Trademarks